United States Patent

Dahl et al.

[11] Patent Number: 6,139,055
[45] Date of Patent: Oct. 31, 2000

[54] ADAPTIVE HEATED STAGE INFLATOR

[75] Inventors: Kim V. Dahl, Clinton; G. Dean Mossi, Roy, both of Utah

[73] Assignee: Autoliv ASP, Inc., Ogden, Utah

[21] Appl. No.: 09/309,043

[22] Filed: May 10, 1999

[51] Int. Cl.[7] .................................................. B60R 21/28
[52] U.S. Cl. ............................................................ 280/741
[58] Field of Search ............................................ 280/741

[56] References Cited

U.S. PATENT DOCUMENTS

| | | |
|---|---|---|
| 4,998,751 | 3/1991 | Paxton et al. . |
| 5,033,390 | 7/1991 | Minert et al. . |
| 5,346,254 | 9/1994 | Esterberg . |
| 5,368,329 | 11/1994 | Hock . |
| 5,398,966 | 3/1995 | Hock . |
| 5,513,879 | 5/1996 | Patel et al. . |
| 5,529,335 | 6/1996 | Bohmler . |
| 5,558,367 | 9/1996 | Cuevas . |
| 5,564,743 | 10/1996 | Marchant . |
| 5,566,976 | 10/1996 | Cuevas . |
| 5,613,702 | 3/1997 | Goetz . |
| 5,690,357 | 11/1997 | Cuevas . |
| 5,725,243 | 3/1998 | Skanberg .................. 280/741 |
| 5,762,368 | 6/1998 | Faigle et al. . |
| 5,794,973 | 8/1998 | O'Loughlin et al. . |
| 5,803,494 | 9/1998 | Headley . |
| 5,851,027 | 12/1998 | DiGiacomo et al. ................. 280/741 |
| 5,857,699 | 1/1999 | Rink et al. ............................ 280/741 |
| 5,863,066 | 1/1999 | Blumenthal . |
| 5,863,067 | 1/1999 | Blumenthal et al. . |

*Primary Examiner*—Kenneth R. Rice
*Attorney, Agent, or Firm*—Sally J. Brown

[57] ABSTRACT

An adaptive multi-stage inflator for inflating an air bag in an air bag safety system. The adaptive multi-stage inflator comprises a housing, a primary igniter assembly and a secondary igniter assembly. The housing has a top wall, a bottom wall and a side wall, which together define an interior chamber therebetween. The primary igniter assembly is disposed in the interior chamber of the housing and is configured to initiate the generation of a primary inflation fluid to inflate an air bag. The secondary igniter assembly is also disposed in the interior chamber of said housing. The secondary igniter assembly is configured to augment the primary inflation fluid by producing a secondary inflation fluid to further inflate the air bag. The inflator also includes a bypass assembly that is configured to provide the secondary inflation fluid to the air bag at substantially the same temperature as it was produced by the secondary igniter assembly, thereby increasing the pressure of the primary inflation fluid. The bypass assembly comprises a bypass passage configured such that the secondary igniter assembly is in direct fluid communication with the air bag. The bypass assembly has a retainer disk which in combination with the interior surface of the housing defines the bypass passage. The inflator also includes a filter disposed in the housing proximate to the side wall thereof to prevent the passage of particulates. The bypass assembly is configured to direct the secondary inflation fluid to the air bag without the secondary inflation fluid passing through the filter. Both the primary igniter assembly and the secondary igniter assembly comprises a quantity of igniter material.

26 Claims, 6 Drawing Sheets

ADAPTIVE HEATED STAGE INFLATOR

BACKGROUND OF THE INVENTION

1. The Field of the Invention

The present invention generally relates to a safety device used in motor vehicles, and more specifically, to a multi-stage inflator used to inflate an air bag during a collision or rapid deceleration.

2. The Relevant Technology

With the advances in technology, it has become well known to protect a vehicle's occupant using an inflatable device, such as an air bag or cushion. When the vehicle, usually an automobile, is involved in a collision, a crash signal actuates the inflator to cause an air bag to deploy and rapidly inflate as inflation fluids escape from an inflator to fill the air bag. The inflation fluids inflate the air bag from an uninflated condition to an inflated condition in a matter of a few milliseconds. The air bag extends into the vehicle occupant compartment and allows a reasonable deceleration of the occupant while preventing the occupant from impacting, by way of example, the steering wheel or passenger side dashboard.

The configuration of the air bag and inflator is important since the air bag and inflator must be mounted within the interior of the vehicle. Consequently, the industry is constantly striving to reduce the size of the air bag and inflator so that a smaller installation area in the vehicle is required. Additionally, the industry strives to provide a rapid expansion of the air bag, in a controlled manner, so that the occupant of the vehicle may be brought to rest faster during the collision. By achieving this, the vehicle occupants encounter lower gravitational-loads during the collision and a reduced chance of injury.

Traditional inflators utilize a single igniter assembly to generate the inflation fluid required to fill the air bag. Typically, the igniter assembly triggers a chemical, pyrotechnic, or some other reaction in the inflator. The inflator then emits the inflation fluid, usually in the form of an inflation gas, that is directed to flow into the air bag. One such device is a pyrotechnic inflator. A pyrotechnic inflator utilizes a combustible gas generating material to create the inflation fluids used to inflate the air bag. The combustible gas generating material produces inflation gases with high temperatures. Unfortunately inflators with only one igniter assembly, also known as single stage inflators, are not capable of varying the degree to which the air bag is inflated in response to the severity of the collision, nor do they reduce the gravitational-loads which a vehicle occupant endures during a collision.

One type of inflator, known as an adaptive multi-stage inflator, has been developed to address these problems. A multi-stage inflator is one which incorporates multiple igniter assemblies to generate additional quantities of inflation fluids to aid in the expansion of the air bag. An adaptive multi-stage action inflator has the additional capability to modify its performance based on various criteria such as, by way of example and not limitation, ambient temperature, severity of the impact, or position of the passengers. For example, in the event of a low speed collision a small amount of inflation fluid is released into the air bag. In contrast, in a severe collision a large amount of inflation fluid is directed into the air bag to increase the ability of the air bag to restrain and cushion the vehicle occupant.

Unfortunately, current multi-stage inflators and adaptive multi-stage inflators still have significant problems. On such problem is known as sympathetic ignition. Sympathetic ignition occurs when the heat generated by the first stage igniter assembly or the combustion of the gas generating material causes the second stage igniter assembly to unexpectedly self-activate after a given time (generally 1–4 minutes), but before the secondary igniter assembly is scheduled to be actuated. Sympathetic ignition usually occurs when the temperature at which the igniter material contained in the secondary igniter assembly will self-ignite is lower than the temperature of the first stage inflator assembly after deployment or the temperature during combustion of the gas generating material. This property is often referred to as the "auto-ignition temperature" of a material. Current non-azide generants and/or igniter materials that have been used in the secondary igniter assemblies have tended to have low auto-ignition temperatures which have contributed to this problem. Sympathetic ignition can be dangerous because if the secondary igniter assembly is not deployed in a timely manner it could potentially pressurize the air bag again and startle or possibly injure the occupant or rescue personnel after a crash.

Another problem with existing adaptive multi-stage inflators and multi-stage inflators are that they tend to be larger than single stage inflators. These type of inflators are larger because they require additional igniters and quantities of igniter material. This is problematic because of the drive to reduce the size of air bag systems in general.

A further problem with existing adaptive multi-stage inflators and multi-stage inflators is the way they direct the additional inflation fluid to the air bag. Previous adaptive multi-stage inflators and multi-stage inflators are typically configured to filter all of the inflation fluid that is directed into the air bag. The filtering process, however, reduces the temperature and pressure of the inflation fluid inside the air bag. As a result, while protecting the air bag, the filtering process reduces the effectiveness of the additional igniter assembly. Consequently, multi-stage inflators typically require a larger amount of igniter material to provide the desired pressure of the inflation gas inside the air bag.

SUMMARY AND OBJECTS OF THE INVENTION

It is an object of the present invention to provide an adaptive multi-stage inflator which substantially reduces and even eliminates the possibility that activating the primary igniter assembly will accidentally ignite a secondary igniter assembly in the inflator.

It is another object of the present invention to provide an adaptive multi-stage inflator with a secondary igniter assembly that has an increased effectiveness in augmenting the inflation fluid generated by the primary igniter assembly.

A further object of the present invention to provide an adaptive multi-stage inflator that augments the performance of the inflator by providing a secondary inflation fluid to the air bag at substantially the same temperature as it exited the secondary igniter assembly.

It is yet another object of the present invention to provide an adaptive multi-stage inflator which efficiently increases the pressure of the primary inflation fluid at a prescribed time.

Another object of the present invention is to provide an adaptive multi-stage inflator which provides a secondary inflation fluid to sufficiently augment the primary inflation fluid while minimizing the quantity of igniter material necessary to generate the requisite quantity of secondary inflation fluid.

Yet another object of the present invention is to provide an adaptive multi-stage inflator capable of generating a quantity of secondary inflation fluid to augment the primary inflation fluid which is sufficiently small in size and weight to meet industry standards.

To achieve the foregoing objects, and in accordance with the invention as embodied and broadly described herein, an adaptive multi-stage inflator is provided for use in inflating an air bag in an air bag safety system. The adaptive multi-stage inflator comprises a housing, a primary igniter assembly, and a secondary igniter assembly. The housing has a top wall a bottom wall, and a side wall, which together define an interior chamber therebetween. The primary igniter assembly is disposed in the interior chamber of the housing and is configured to initiate the generation of a primary inflation fluid to inflate an air bag. The secondary igniter assembly is also disposed in the interior chamber of said housing. The secondary igniter assembly is configured to augment the primary inflation fluid by producing a secondary inflation fluid to further inflate the air bag. The inflator also includes a bypass assembly that is configured to provide the secondary inflation fluid to the air bag at substantially the same temperature as it was produced by the secondary igniter assembly. thereby increasing the pressure of the primary inflation fluid. The bypass assembly comprises a bypass passage configured such that the secondary igniter assembly is in direct fluid communication with the air bag. The bypass assembly also includes a retainer disk which in combination with the interior surface of the housing defines the bypass passage.

The inflator also includes a filter disposed within the housing proximate to the side wall thereof to prevent the passage of particulates. The bypass assembly is configured to direct the secondary inflation fluid to the air bag without the secondary inflation fluid passing through the filter. The primary igniter assembly is located proximate to the filter. Both the primary igniter assembly or the secondary igniter assembly comprises a quantity of igniter materials. The quantity of igniter material in the secondary igniter assembly may be composed of a material that has an auto-ignition temperature higher than that of the gas generating material. thereby reducing sympathetic ignition problems.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to an adaptive multi-stage inflator assembly for an air bag system which deploys an air bag in the event of a collision or impact. In general, the adaptive multi-stage inflator assembly comprises a number of igniter assemblies that produce an inflation fluid to inflate the air bag. The primary igniter assembly activates a quantity of gas generating material which creates a primary inflation fluid, such as an inflation gas, that is directed to the air bag. The subsequent igniter assemblies are configured such that they will not ignite due to the influence of the heat generated by either the primary igniter assembly or the gas generating material. Further, the additional igniter assemblies generate a substantial quantity of heat carried by a small amount of gas to increases the temperature and pressure of the primary inflation gas. While the description is directed to an adaptive multi-stage inflator, it is intended that the discussion be equally applicable to multi-stage igniters that are not adaptive.

Figure 1:
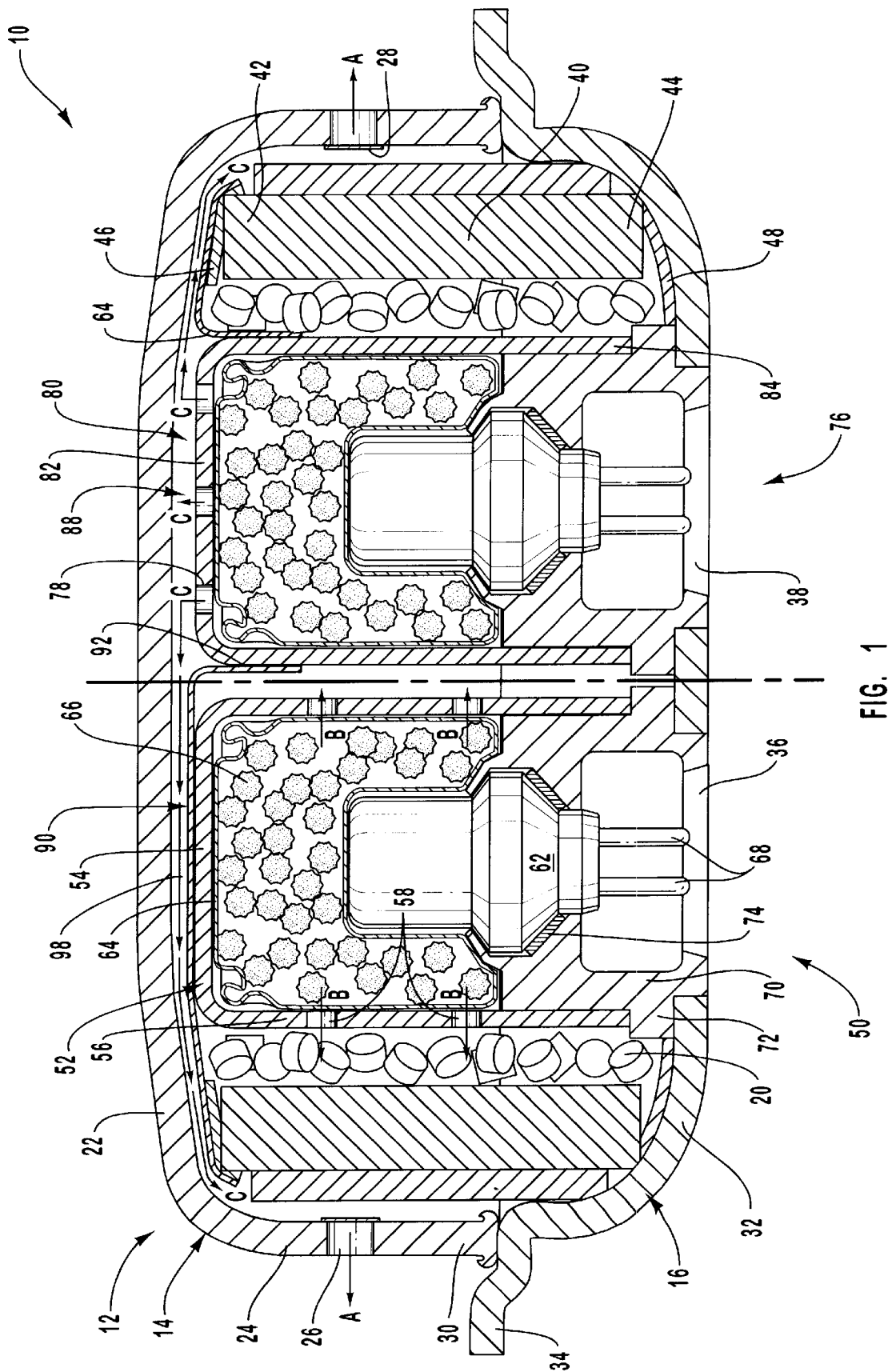
FIG. 1 is a cross-sectional view of one embodiment of an adaptive multi-stage inflator.

One embodiment of an adaptive multi-stage inflator is shown generally in FIG. 1 by the reference numeral 10. Inflator 10 includes a housing 12, a primary igniter assembly 50, and a secondary igniter assembly 76. As illustrated, one embodiment of housing 12 comprises a diffuser cover 14 and a base 16. Diffuser cover 14 comprises a top wall 22 and a downwardly depending, side wall 24. As depicted, side wall 24 is integral with top wall 22. Side wall 24 could, however, be attached to top wall 22 using conventional methods of attachment and fasteners, including but not limited to, welds, screws, bolts, or the like. In this embodiment, diffuser cover 14 is substantially cup-shaped and forms the upper portion of housing 12. Diffuser cover 14 may have various other configurations, by way of example and not limitation, such as oval, elliptical, round, rectangular, square, or any variation of these shapes. One embodiment of diffuser cover 14, illustrated in FIG. 1, is substantially round. In general, however, what is important is that diffuser cover 14 and base 16 are configured to cooperate and to form a scaled enclosure.

Base 16 is configured to cooperate with diffuser cover 14 and, more specifically, with a remote end 30 of side wall 24. Base 16 comprises a lower portion 32 and a mounting flange 34. Base 16 and diffuser cover 14 are configured to define an interior chamber (not shown) therebetween. Consequently, the cross-sectional configuration of lower portion 32 of base 16 and diffuser cover 14 are substantially the same. Like diffuser cover 14, base 16 may have various other configurations such as oval, elliptical, round, rectangular, square, or any variation of these shapes, and perform the function thereof as long as base 16 cooperates with remote end 30 of side wall 24. Accordingly, in one embodiment that is illustrated, lower portion 32 of base 16 is substantially round.

Mounting flange 34 of base 16 extends substantially radially outward from lower portion 32. Mounting flange 34 is used to mount inflator 10 in the passenger compartment of the vehicle. In one embodiment. mounting flange 34 is integrally formed with lower portion 32. Mounting flange 34 could, however, be attached to either lower portion 32 of base 16 or side wall 24 of diffuser cover 14 by conventional fasteners or attaching methods such as, by way of example, screws, bolts, or welds. In view of the teachings contained herein, it can be appreciated that mounting flange 34 may have various other configurations and perform the function thereof.

As generally described, housing 12 is preferably composed of materials which can withstand the pressures and temperatures associated with generating an inflation gas. By way of example and not limitation, housing 12 may be comprised of materials ranging from Iconel, steel, aluminum, or alloys thereof.

Arranged around side wall 24 of diffuser cover 14 are a plurality of discharge ports 26. Discharge ports 26 allow the inflation gases generated within housing 12 to flow outwardly into an air bag (not shown) as indicated in FIG. 1 by arrows A. Discharge ports 26 may have various configurations, such as, oval, elliptical, round, rectangular, or square, or combinations thereof, which aid in efficiently filling the air bag with the inflation gas. The location and number of discharge ports 26 may vary as necessary to effectively discharge the inflation gas. A thin foil sealing tape 28 covers discharge ports 26 to prevent the entry of contaminants into housing 12 during the life of inflator 10. Sealing tape 28 is pressure sensitive and is readily ruptured by the pressure of the inflation gas created within housing 12. In one configuration, sealing tape 28 comprises an aluminum sealing tape. In another embodiment, the inside of diffuser cover 14 of housing 12 is covered with a aluminum foil or other suitable material that is adhesively applied, such as with a thermoset adhesive, to form a hermetic or environmental seal. It can be appreciated that one skilled in the art can identify various other configurations of sealing tape 28 which are also capable of performing the same function of preventing the entry of contaminants into housing 12.

Inflator 10 also includes primary igniter assembly 50 that is disposed within housing 12. Primary igniter assembly 50 is used to initiate the process for rapidly inflating the air bag cushion (not shown). In one embodiment depicted in FIG. 1, primary igniter assembly 50 is located within housing 12 and is substantially aligned with a primary opening 36 formed in lower portion 32 of base 16. Primary igniter assembly 50 includes a housing 52 and an initiator 62 that is disposed within housing 52. Housing 52 of primary igniter assembly 50 comprises a top wall 54 and side wall 56 extending therefrom that gives housing 52 a cup-shaped configuration. In one embodiment, housing 52 has a cylindrical cross-section. Housing 52 may, however, have various cross-sectional configurations such as oval, elliptical, round, rectangular, square, or any variation of these shapes.

As depicted, top wall 54 of housing 52 is integrally formed with side wall 56. Side wall 56 could, however, be attached to top wall 54 using conventional methods of attachment and fasteners, including but not limited to, welds, screws, bolts, and perform the function thereof effectively.

Side wall 56 of housing 52 has a plurality of apertures 58 to communicate with the interior chamber of housing 12. As illustrated, apertures 58 are generally round. It will be appreciated by one skilled in the art that apertures 58 may have any configuration which will allow the inflation gases to escape out of housing 52 of primary igniter assembly 50. For example, apertures 58 may have various cross-sectional configurations such as oval, elliptical, round, rectangular, or square, or any variation of these shapes.

Primary igniter assembly 50 also includes an igniter cup 64. Igniter cup 64, as depicted in FIG. 1, is generally cylindrical-shaped and is configured to be received in housing 52 and to cooperate with initiator 62. Igniter cup 64 contains an igniter material 66 that when ignited by initiator 62 will produce heat and/or gases sufficient to ignite gas generating material 20. In general, igniter cup 64 may have various configurations and sizes so long as it cooperates with housing 52 and initiator 62. By way of example and not limitation. igniter cup 64 may be oval, elliptical. round, rectangular, square, or any variations of these shapes.

Housing 52 and igniter cup 64 are formed of materials which are capable of withstanding the pressures and temperatures associated with combustion of primary igniter materials such as igniter material 66. By way of example and not limitation, housing 52 and igniter cup 64 may be substantially composed of Iconel, steel, aluminum, or alloys thereof.

Initiator 62, as depicted in FIG. 1, is configured to cooperate with igniter cup 64 of primary igniter assembly 50. In this embodiment, primary igniter assembly 50 is a pyrotechnic igniter and includes electrical terminals 68. Electrical terminals 68 are aligned with primary opening 36 formed in lower portion 32 of base 16 to connect with an electrical activation system of the motor vehicle (not shown). It can be appreciated by one skilled in the art that various other configurations of initiator 62 may perform the function thereof. By way of example and not limitation, initiator 62 may be any conventional electrical squib, a spark-discharge, a heated or exploding wire/foil, or the like.

Initiator 62 is held in cooperation with igniter cup 64 by an adaptor plug 70. Adaptor plug 70 is preferably composed of a metal material. A seal 74, such as an annular O-ring, is disposed between initiator 62 and adaptor plug 70 to form a seal therebetween. Seal 74 is secured in place between initiator 62 and adaptor plug 70 by crimping the upper portion of adaptor plug 70 against initiator 62, Adaptor plug 70 and initiator 62 can be joined by various other conventional joining techniques such as welding, brazing, or the like.

Adaptor plug 70 of primary igniter assembly 50 is disposed in primary opening 36 of base 16 and extends within housing 52 of primary igniter assembly 50 to abut igniter cup 64. As a result, adaptor plug 70 closes off the open end of housing 52 to form a sealed ignition chamber in primary initiator assembly 50. Adaptor plug 70 includes an outwardly extending radial flange 72 which is supported by the inside surface of lower portion 32 of base 16. Adaptor plug 70 is fixedly attached to lower portion 32 of base 16 by conventional attachment methods such as welding or other conventional fasteners known by one skilled in the art.

Various other configurations of adaptor plug 70 may be used to perform the desired function. For example, adaptor plug 70 may have various configurations and sizes to cooperate with different types of initiators 62. In another configuration, adaptor plug 70 is formed without radial flange 72 but is configured to cooperate with primary opening 36 in base 16 through use of a screw thread, or other fastening techniques. Alternatively, adaptor plug 70 may be formed so as to be attached to the other elements of primary igniter assembly 50 using conventional press fitting techniques.

Multi-stage inflator 10 also includes secondary igniter assembly 76 that is disposed within housing 12. As illustrated, secondary igniter assembly 76 is positioned in a secondary opening 38 formed in lower portion of base 16. Secondary igniter assembly 76 is configured to generate heat and/or a quantity of secondary inflation fluid to augment and increase the pressure and temperature of the inflation gases formed by primary igniter assembly 50. Secondary igniter assembly 76 has substantially the same features as that of primary igniter assembly 50. The features that are not effected are identified with the same reference number as used for primary igniter assembly 50. Only those features that have changed will be discussed in detail.

Secondary igniter assembly 76 includes housing 80 that comprises a top wall 82 and a side wall 84. In this case, it is top wall 82 that has a plurality of apertures 78 are formed therein. This is in contrast to apertures 58 formed in side wall 56 of first igniter assembly 50. The change in the position of apertures 78 in the secondary igniter assembly 76 directs the secondary inflation gas in a different direction than was done in primary igniter assembly 50 and is important to the present invention. It can, however, be appreciated that apertures 78 may be formed anywhere through housing 80 of secondary igniter assembly 76. so long as they cooperate with the other features of the present invention to direct the flow of the inflation gas and heat generated by secondary igniter assembly 76 as will be discussed in more detail below. Further, secondary initiator assembly 76 also has the ability to be adapted to have various time delays for actuation after the ignition of primary igniter assembly 50.

In one embodiment, igniter material 66 in primary igniter assembly 50 and secondary igniter assembly 76 is substantially composed of boron potassium nitrate ($BKNO_3$). It will be appreciated, however, that igniter material 66 may be composed of various other types of materials known by one skilled in the art. In addition, igniter material 66 of secondary igniter assembly 76 may or may not have a different composition than igniter material 66 of primary igniter assembly 50, depending on the particular use and requirements needed to inflate the air bag (not shown).

One advantage of using igniter material 66 in secondary igniter assembly 76 that comprises $BKNO_3$ is that $BKNO_3$ has an auto-ignition temperature that is higher than that of current gas generating materials 20 that are currently being used, such as non-azide gas generating materials. As previously mentioned, the "auto-ignition temperature" is the temperature at which a material, such as igniter material 66 in secondary igniter assembly 76 will ignite or combust on its own in response to the surrounding temperature. As a result, igniter material 66 in secondary igniter assembly 76, such as $BKNO_3$, is less likely to be ignited from a sympathetic ignition than materials with an auto-ignition temperature less than that of igniter material 66 in primary ignition assembly 50 or gas generating material 20. Further, another advantage is that $BKNO_3$ produces a large amount of heat and a small amount of gas.

It is contemplated that igniter material 66 in secondary igniter assembly 76 may be comprised of various types of gas generating materials or other types of igniter materials In one embodiment, igniter material 66 in secondary igniter assembly 76, may comprise an igniter material such as boron potassium nitrate ($BKNO_3$), or an azide gas generating material, or the like which have an auto-ignition temperature higher than either igniter material 66 in primary igniter assembly 50 or gas generating material 20, thereby substantially eliminating the problem of sympathetic ignition. In an alternate embodiment, igniter material 66 in secondary igniter assembly 76 has an auto-ignition temperature higher than that of igniter material 66 in primary igniter assembly 50 so as to reduce the potential of sympathetic ignition. In another embodiment of the present invention, igniter material 66 in secondary igniter assembly 76 has an auto-ignition temperature greater than the temperature at which gas generating material 20 combusts, which also helps to reduce the potential of sympathetic ignition. It will be appreciated that one skilled in the art will know of various other types of materials that may be used as igniter material 66 for secondary igniter assembly 76.

As depicted in FIG. 1, igniter material 66 is depicted as being in pellet form. As can be appreciated by one skilled in the art, igniter material 66 may have various other configurations, such as granules, strands, wafers, or other similar forms.

In an alternate configuration, housing 12 may have only a single opening formed in base 16 for primary igniter assembly 50 and secondary igniter assembly 76. In that case, secondary igniter assembly 76 is configured to cooperate with primary igniter assembly 50 such that both primary and secondary igniter assemblies 50 and 76 are located within the same opening. As such, primary igniter assembly 50 may surround secondary igniter assembly 76 or vice versa. Further, although primary igniter assembly 50 and secondary igniter assembly 76 are depicted as being substantially the same size it is contemplated that in different embodiments the size of the may differ. In addition, while FIG. 1 illustrates primary igniter assembly 50 and secondary igniter assembly 76 as being symmetrically located in housing 12 it can be appreciated that this is not necessary and primary igniter assembly 50 and secondary igniter assembly 76 may be asymmetrically disposed in housing 12. Base 16 of housing 12 would have primary opening 36 and secondary opening 32 configured to cooperate with primary igniter assembly 50 and secondary igniter assembly 76 respectively. In another configuration lower portion 32 includes a plurality of openings dependent on the specific configuration of inflator assembly 10 and the number of igniter assemblies.

Inflator 10 also includes a filter 40 which is located within the interior chamber of housing 12 proximate to side wall 24 of diffuser cover 14. Filter 40 is generally an annular shape and has an upper lateral end 42 and a lower lateral end 44. Upper lateral end 42 of filter 40 is partially contacting a first damper pad 46 located near top wall 22, while lower lateral end 42 is in contact with a second damper pad 48 disposed against the inside surface 18 of lower portion 32 of base 16. As illustrated in FIG. 1, filter 40 substantially extends from top wall 22 of diffuser cover 14 to lower portion 32 of base 16.

In general, filter 40 may have various configurations as long as it cooperates with interior chamber of housing 12. Filter 40 is preferably composed of materials which will withstand the pressures and temperatures associated with the production of the primary inflation gas. A variety of filters 40 may be used and perform the function thereof.

A gas generating material 20 is disposed in the interior chamber of housing 12 between filter 40 and primary and secondary igniter assemblies 50 and 75. Gas generating material 20 is composed of a material which rapidly combusts when ignited by primary igniter assembly 50 to provide the necessary volume of primary inflation gas for inflating the air bag. Gas generating material 20 forms a quantity of particulate material when it combusts which is prevented from leaving housing 12 by filter 40. Filter 40 is configured to have an inner face with a large surface area for receiving hot particulate material generated within housing 12. Filter 40 prevents the transmission of the hot particulate material through discharge ports 26. However, by preventing the passage of the particulate material, filter 40 reduces the temperature of the inflation gas directed to the air bag. First damper pad 46 and second damper pad 48 aid in preventing the primary inflation gas from circumventing filter 40.

As illustrated, in one embodiment, gas generating material 20 is in close proximity with primary and secondary igniter assemblies 50 and 76. One skilled in the art can identify various other configuration and locations of gas generating material 20, as necessary for the particular need of inflator assembly 10.

Although gas generating material 20 is depicted in pellet form, it may have numerous forms, such as liquid, granules, strands, wafers and the like. Additionally, gas generating material 20 may be composed of various materials so long as they are capable of rapidly creating the requisite amount of inflation gas at the desired temperature.

According to another aspect of the present invention, inflator assembly 10 includes a bypass assembly 88. In one embodiment, bypass assembly 88 comprises a retainer disk 90 and a bypass passage 98. One embodiment of retainer disk 90 is depicted in FIG. 1 and is formed so as to have a hollow collar portion 92 that extends toward base 16 and is adapted to receive housing 80 of secondary igniter assembly 76. The peripheral edge of retainer disk 90 is configured to securely hold filter 40 in the desired position. Bypass passage 98 is defined by retainer disk 90 and the inside surface of diffuser cover 14 of housing 12. Retainer disk 90, and consequently bypass passage 98, direct the hot secondary inflation gases generated by secondary igniter assembly 76 around filter 40 and out discharge ports 26 formed in diffuser cover 14 to augment primary inflation gases created by primary igniter assembly 50 and gas generating material 20. Retainer disk 90 and bypass passage 98 are specifically configured to direct the inflation gases created by secondary igniter assembly 76 in a direction that bypasses and avoids filter 40 thereby providing the secondary inflator gases to the air bag at substantially the same temperature as produced by secondary igniter assembly 76. This substantially reduces and even eliminates the majority of the heat loss that occurs when the inflation gases pass through filter 40. Retainer disk 90 and bypass passage 98 are one structure capable of performing the function of a bypass means for providing secondary inflation fluid to the air bag at substantially the same temperature as produced by the secondary igniter assembly, thereby increasing the pressure of the primary inflation fluid. Since retainer disk 90, in cooperation with top wall 20 of diffuser cover 14, form bypass passage 98 that is configured to direct the secondary inflation gas to circumvent filter 40 there is no reduction in temperature of the secondary inflation gas caused by the filtering process. Consequently, the majority of the heat generated by secondary igniter assembly 76 is transmitted to primary inflation gas within the air bag, thereby causing a rapid increase in the temperature and pressure of primary inflation gas. This is an important advantage over previous multi-stage inflators, since it allows greater control of the deployment of the air bag. Other advantages of this design are that the quantities of gas generating material 20 and igniter materials 66 in the igniter assemblies 50 and 76 can be reduced without effecting the performance of inflator 10. This allows the size of inflator 10 to be similar to that of a single sate inflator and be smaller that conventional multi-stage inflators.

Although the inflation gases generated by secondary igniter assembly 76 are not filtered to remove any combustion particles, the amount of particulates generated may be controlled by varying the composition of igniter material 66 used in secondary igniter assembly 76. In addition, the amount of particles are sufficiently low that they do not harm the air bag cushion.

In view of the teaching contained herein, one skilled in the art can identify various other configurations of structure capable of forming bypass means for providing secondary inflation fluid to the air bag at substantially the same temperature as produced by secondary igniter assembly 76. By way of example and not limitation. in an alternative embodiment inflator 10 may not include a retainer disk 90. Rather, housing 80 of secondary igniter assembly 76 may have a flange that is configured to cooperate with inside surface of diffuser cover 14 to form a bypass passage 98 to direct secondary inflation gases around filter 40 and out discharge ports 26 of housing 12. As a result, igniter housing 80 in secondary igniter assembly 76 would perform the function of retainer disk 90 by cooperating with diffuser cover 14 to define bypass passage 98. In yet another configuration, housing 52 in primary igniter assembly 50 could have a flange that is in sealing engagement with housing 80 of secondary igniter assembly 76 to act as a retainer disk 90 and define bypass passageway 98.

When inflator 10 is actuated, an electrical signal is transmitted through electrical terminals 68 in primary igniter assembly 50 to actuate initiator 62. Upon initiator 62 being triggered, it ignites igniter material 66 in primary igniter assembly 50. The ignition of igniter material 66 generates a quantity of heat, hot combustion products and gases that exit primary igniter assembly 50 through apertures 58 in housing 52 as shown by arrows B. The heat, hot combustion products and gases from primary igniter assembly 50 ignite gas generating material 20 which rapidly creates the majority of the primary inflation gases. The primary inflation gases generated by gas generating material 20 pass through filter 40 and increases the pressure within housing 12 until sealing tape 28 ruptures to allow the primary inflation gases to exit housing 12 through discharge ports 26 and inflate the air bag (not shown).

Either simultaneously or within a short period of time after triggering primary ignition assembly 50 and combustion of gas generating material 20, an electrical signal is transmitted to secondary igniter assembly 76. A similar production of heat and secondary inflation gases occurs as above, however, the secondary inflation gases exit secondary igniter assembly 76 through apertures 78 formed in top wall 82 of housing 80. The heat and secondary inflation gases created by ignition of secondary ignition assembly 76 are directed by bypass assembly 88. As a result, secondary inflation gases flow into bypass passage 98 defined by retainer disk 90 and the inside surface of top wall 22 of diffuser 14. Bypass passageway 98 directs the secondary inflation gas toward discharge ports 26 while bypassing filter 40. This flow is depicted by arrows C in FIG. 1. Secondary inflation gases exit housing 12 through discharge ports 26 without passing through filter 40. By directing the secondary inflation gases around filter 40 the majority of the heat generated by ignition of igniter material 66 in secondary igniter assembly 76 is passed directly to the primary inflation gases. The heat delivered by secondary inflation gases augments the primary inflation gases to improve the performance of inflator 10. As a result, the pressure of the combined primary and secondary inflation gases provides greater protection to the vehicle's occupant in the event of a crash.

EXAMPLES

The following examples are given to illustrate the operation of a performance of the present invention and are not intended to limit the scope of the present invention. The tests were conducted with one embodiment of inflator 10 depicted in FIG. 1 to show the benefits of the present invention.

Example 1

A standard industry 60 Liter Tank Test was performed using one embodiment of a multi-stage inflator 10 that is illustrated in FIG. 1. A 60 Liter Tank Test involves attaching a housing of an inflator to an end cap of a 60 liter tank. The inflator is attached such that the inflation gases are directed into the tank when the end cap is fixably attached to the body of the tank. During the test, the inflator is activated and the variations in pressure are plotted.

Figure 2:
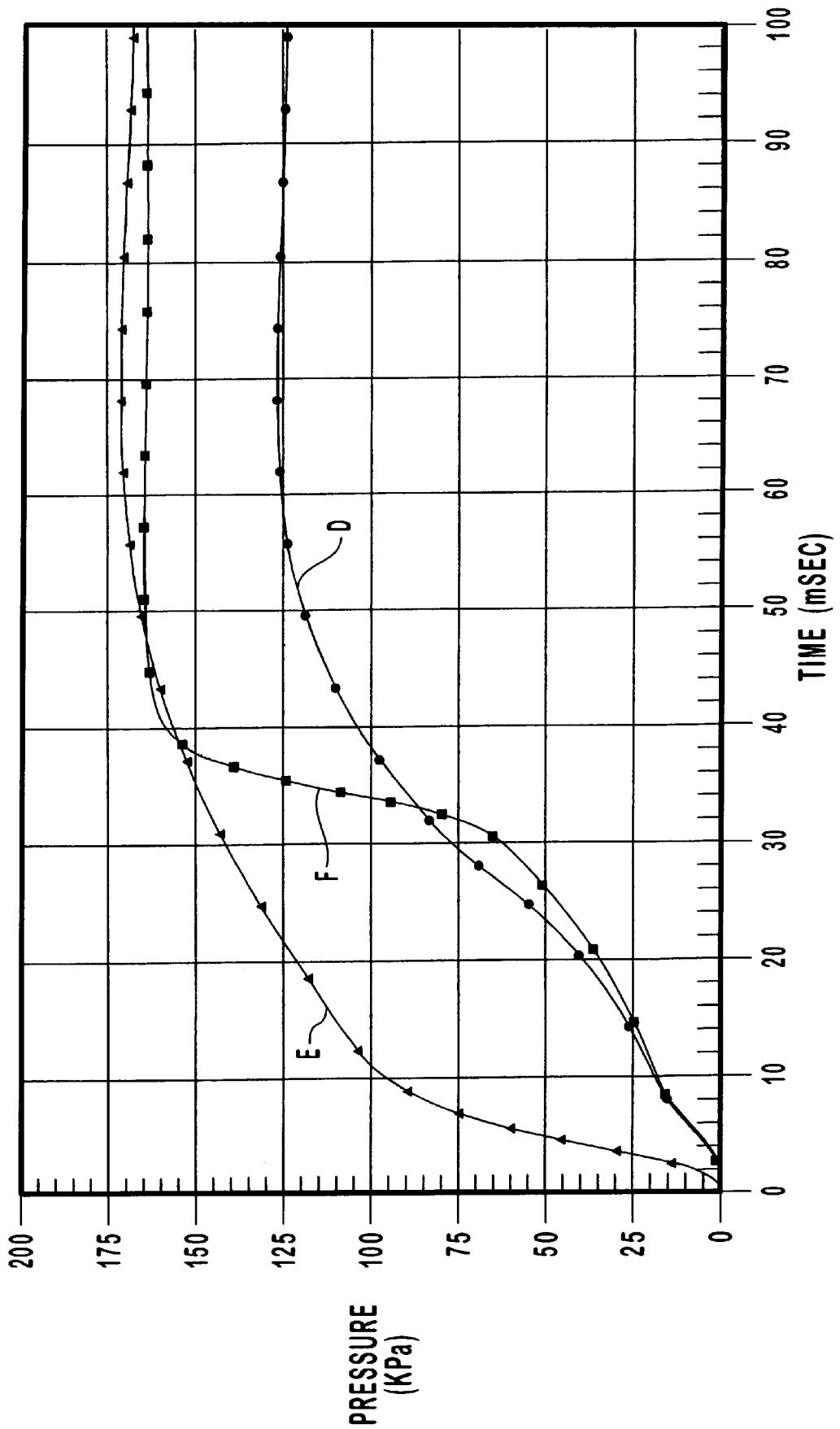
FIG. 2 is a graph representing a comparison of the performance of the primary igniter assembly alone to the simultaneous ignition of the primary igniter assembly and the secondary igniter assembly and the primary igniter assembly with a time-delayed ignition of the secondary igniter assembly.

FIG. 2 is a graph representing the pressure of the inflation gases generated by one embodiment of inflation 10 over time. Curve D represents the performance of primary igniter assembly 50 of inflator 10 alone. In this test, inflator 10 contained 33 grams of a conventional gas generating material 20. Additionally, 2.6 grams of igniter material 66 such as boron potassium nitrate ($BKNO_3$) was used in primary igniter assembly 50. Using only primary igniter assembly 50 inflator 10 generated a maximum pressure of 127 KPa.

Curve E depicts the results of a test of multi-stage inflator 10 utilizing both primary igniter assembly 50 and a secondary igniter assembly 76 simultaneously. Again inflator 10 contained 33 grams of a conventional gas generating material 20. In this test, 2.6 grams of igniter material 66 was used in both primary igniter assembly 50 and secondary igniter assembly 76. In this test, a maximum tank pressure of 171 KPa was reached for inflator 10. The increased pressure shows the boosting effect of secondary igniter assembly 76. A comparison of Curve E to Curve D shows that the gradient of Curve E is greater than that of Curve D. This indicates that inflator 10 would inflate the air bag in a shorter period of time and provide protection to the occupant of a vehicle more quickly.

Curve F illustrates the results achieved with the same parameters used to generate Curve E, but with a 30 millisecond delay between actuation of primary igniter assembly 50 and secondary igniter assembly 76. A maximum pressure of approximately 165 KPa was reached.

Both Curves E and F illustrate the boosting effect of secondary igniter assembly 76. A comparison of the curves in FIG. 2 shows that the gradient for Curve F is less than that of either Curve D or E. However, when secondary igniter assembly 76 is activated, the gradient of Curve F rapidly increases to reach substantially the same pressure as that of Curve D. Curve F does not, however, quite achieve the same pressure as the simultaneous activation of primary igniter assembly 50 and secondary igniter assembly 76 shown by Curve E. The initial inflation of the air bag is, however, more controlled using the 30 millisecond delay in actuation of the secondary igniter assembly 76 as illustrated by Curve F.

Example 2

Figure 3:
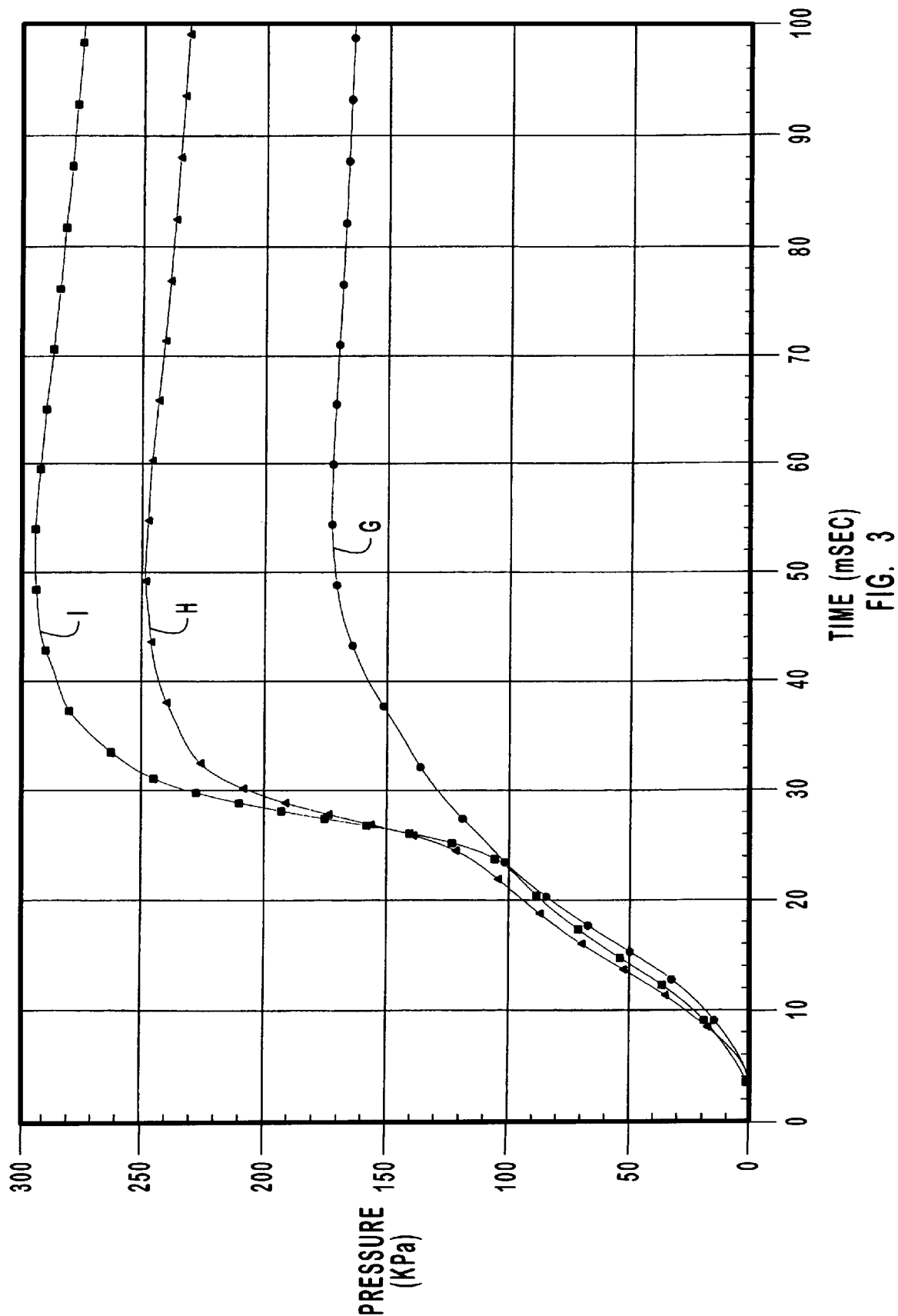
FIG. 3 is a graph representing a comparison of the performance of the primary igniter assembly alone and two tests using the multi-stage inflator of FIG. 1.

FIG. 3 illustrates the results from a 60 Liter Tank Test, similar to that performed for Example 1 and illustrated in FIG. 2. In this example, however, 37 grams, of gas generating material 20 was used in inflator 10 rather than the 33 grams used in Example 1.

Curve G depicts the data from igniting only primary igniter assembly 50 alone. The pressure reached in this test was approximately 175 KPa. Curve H shows the results of a test of inflator 10 using 2 grams of an igniter material such as boron potassium nitrate ($BKNO_3$) in both primary igniter assembly 50 and secondary igniter assembly 76. In this test, a 25 millisecond delay between the activation of primary igniter assembly 50 and secondary igniter assembly 76 was used. As may be seen, the shape of Curve H generally follows that of Curve G, however, Curve H reached a higher pressure of nearly 250 KPa as a result of the augmentation by secondary igniter assembly 70. The use of secondary igniter assembly 76 increases the ability of the air bag to provide protection to the vehicle occupant during a collision.

Curve I shows the data from another test that was performed in a similar manner to the test that formed Curve H, but the quantity of igniter material 66 was increased from 2 grams to 3 grams. As illustrated by Curve H, the increase of 1 gram of igniter material 66 in both primary igniter assembly 50 and secondary igniter assembly 76 increased the pressure by approximately 50 KPa. These tests show that a significant increase in pressure can be achieved using little igniter material 66 because the heat is directly diffused into the primary inflation gases.

Example 3

Figure 4:
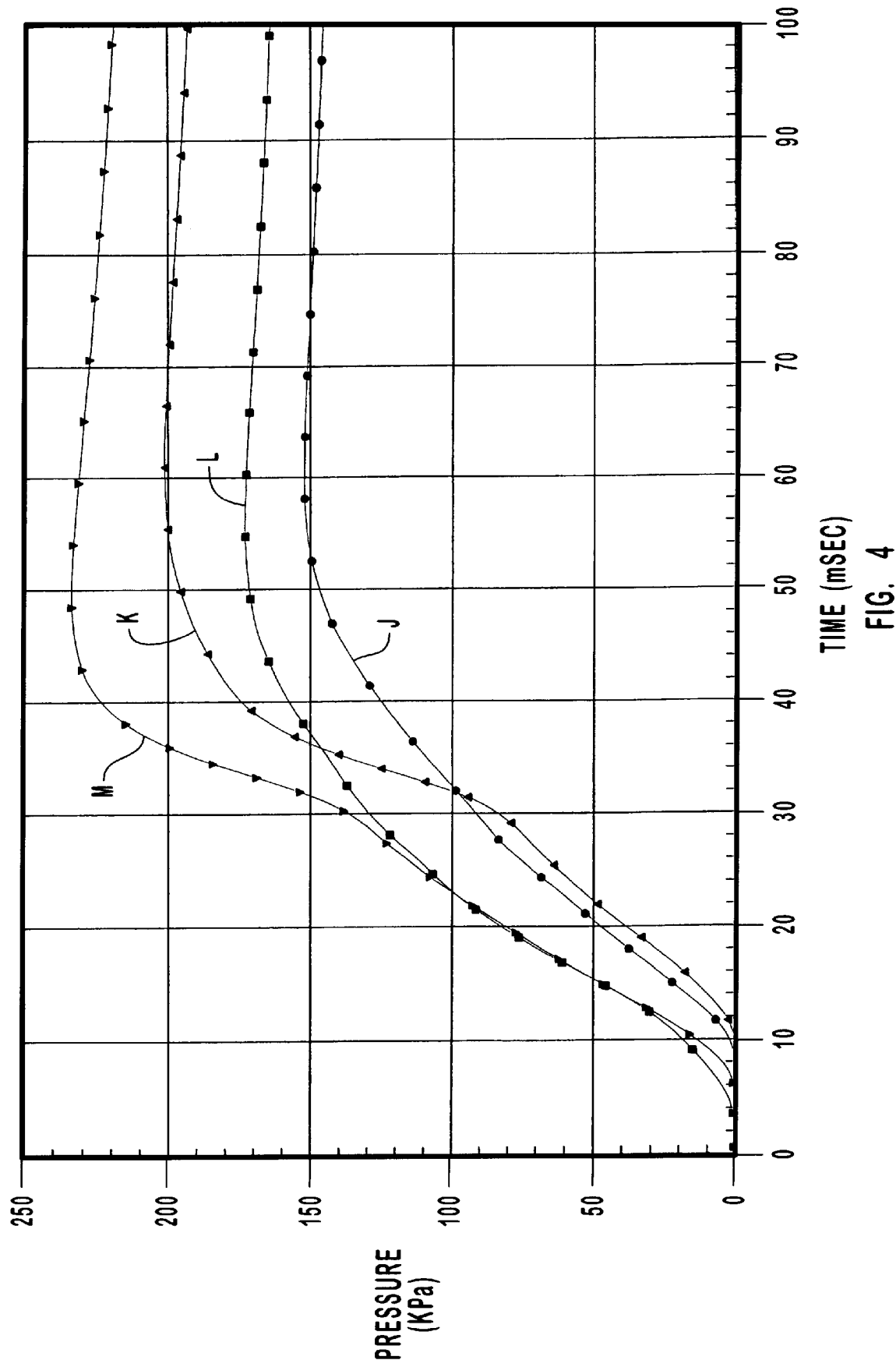
FIG. 4 is a graph representing data from tests comparing the performance of the primary igniter assembly alone to the multi-stage inflator of FIG. 1 with various time delays between ignition of the primary igniter assembly and the secondary igniter assembly.

FIG. 4 represents two groups of tests comparing the performance of the primary igniter assembly 50 alone to when both primary igniter assembly 50 and secondary igniter assembly 76 were used. This is similar to the tests that were discussed in Example 1. The first group of tests depicted in FIG. 4 as Curves J and K were a comparison between the performance of primary igniter assembly 50 alone and the combination of primary igniter assembly 50 and secondary igniter assembly 76 in inflator 10. In this group of tests 2.5 grams of igniter material 66 was used in both primary inflator assembly 50 and secondary igniter assembly 76. Inflator 10 also contained 33 grams of gas generating material 20. As illustrated in FIG. 4, Curve J shows that ignition of primary igniter assembly 50 alone achieved a maximum pressure of approximately 150 KPa within approximately 60 milliseconds after actuation.

In contrast, Curve K depicts the data from the test which utilized both primary igniter assembly 50 and secondary igniter assembly 76 with a 30 millisecond delay. As can be seen from Curve K, the rate at which the pressure increases is more rapid than when primary inflator assembly 50 was used alone, as illustrated by Curve J. In addition, the maximum pressure attainable with this configuration was approximately 200 KPa instead of 150 KPa as shown in Curve J. Curves L and M represent the second group of tests comparing the performance of primary igniter assembly 50 alone to the combination of primary igniter assembly 50 and secondary igniter assembly 76. In this group of tests 37 grams of gas generating material 20 was used. The amount of igniter material 66 used in both primary igniter assembly 50 and secondary igniter assembly 76 was 2.5 grams, as was used to generate Curves J and K. Curve L depicts the results achieved by ignition of primary igniter assembly 50 alone. In this case. the maximum pressure obtained was approximately 175 KPa.

Curve M represents the pressure obtained when both primary igniter assembly 50 and secondary igniter assembly 76 were used to generate inflation gases. Like Curve L, this test used 37 grams of gas generating material 20 and 2.5 grams of igniter material 66 in both primary igniter assembly 50 and secondary igniter assembly 76. Secondary igniter assembly 76 had a 30 millisecond delay. The maximum pressure achieved in this test, as shown by Curve M, was between 240 KPa and 260 KPa within 40 to 50 milliseconds. As may be seen from FIG. 4, the use of secondary igniter assembly 76 augments the performance of primary igniter assembly 50 in both cases. In addition, the increased quantity of gas generating material 20 in combination with the use of both primary igniter assembly 50 and secondary igniter assembly 76, as reflected by Curve M, results in a more rapid increase in the inflation gas pressure and also a higher attained pressure.

Example 4

Linear impact tests were performed to test inflator 10. During this test, a dummy was accelerated to between 12 mph and 20 mph, at which point a crash was simulated causing the deployment of the air bag. The air bag was inflated as igniter assemblies 50 and 76 within inflator 10 activated and forced the inflation fluids into the air bag. Simultaneously, the dummy travelled a distance towards the simulated dashboard and was restrained by the air bag that was rapidly inflated.

Figure 5:
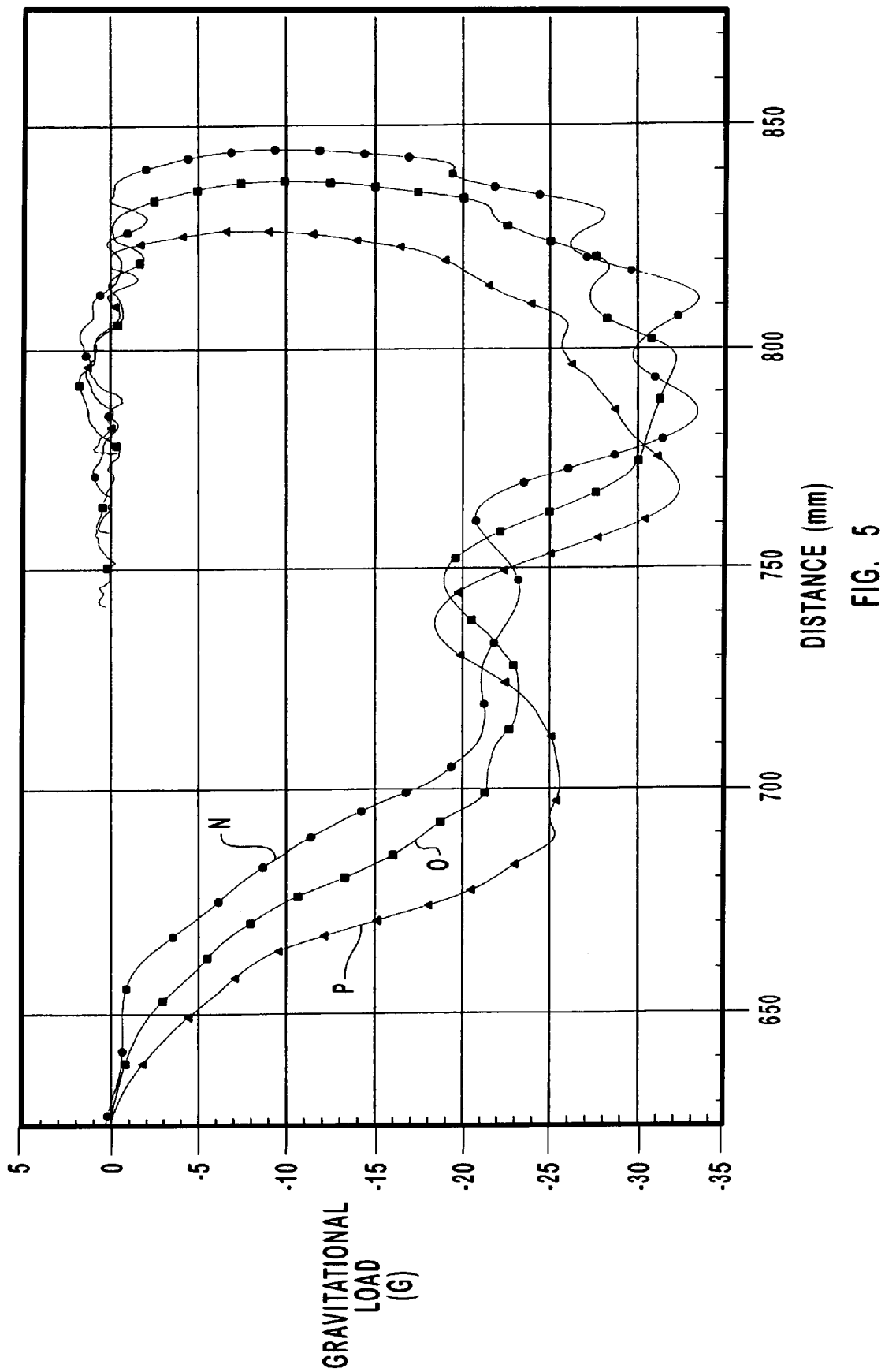
FIGS. 5 and 6 are graphs of the data from linear impact tests comparing the performance of the primary igniter assembly alone and the multi-stage inflator of FIG. 1 using various time delays.

In this example, tests were run to compare the performance of inflator 10 by activating only primary igniter assembly 50 as compared to the results attained using primary igniter assembly 50 in combination with secondary igniter assembly 76 with various delays. In all three tests, 37 grams of gas generating material 20 was utilized. In addition, 2.5 grams of igniter material 66 was used in both primary igniter assembly 50 and secondary igniter assembly 76. FIG. 5 depicts the distance which the dummy travelled during the collision and the gravitational-loads (G) experienced by the dummy during the collision.

Curve N represents the distance travelled by the dummy and the gravitational-loads associated with the use of only primary inflator assembly 50 in inflator 10. As may be seen from Curve N, the gravitational-loads applied to the dummy reached a high of approximately 32 G to 34 G as the dummy was decelerated. In this test. the dummy travelled a maximum distance forward of approximately 840 mm to 850 mm before beginning to move back towards the starting position.

Curve O represents the same test using both the primary igniter assembly 50 and the secondary igniter assembly 76. In this test, the secondary igniter assembly had a 25 millisecond delay. The other parameters of the test remained the same. As shown by Curve O, the highest gravitational-load applied to the dummy due to the rapid deceleration was between 32 G and 33 G. In addition, in the test depicted by Curve O. the dummy travelled a maximum distance of between 830 mm to 840 mm before beginning to move back towards the starting position. When Curves N and O are compared it can be seen that the addition of secondary igniter assembly 76, reduces both the gravitational forces experienced by the occupant as well as the distance travelled by the occupant before being restrained by the air bag.

Curve P depicts the data from a test that was performed in a similar fashion to that used with Curve O except that the test that produced Curve P utilized a 30 millisecond delay before actuating secondary igniter assembly 76. As shown by Curve P in FIG. 5, the distance the dummy travelled was between 820 mm and 830 mm and the gravitational load experienced by the dummy decreased slightly to approximately 32 G. From this test it appears that the longer delay in actuating secondary igniter assembly 76 reduces the distance travelled by the vehicle occupant, but does not significantly reduce the maximum gravitational forces experienced by the occupant.

Example 5

Figure 6:
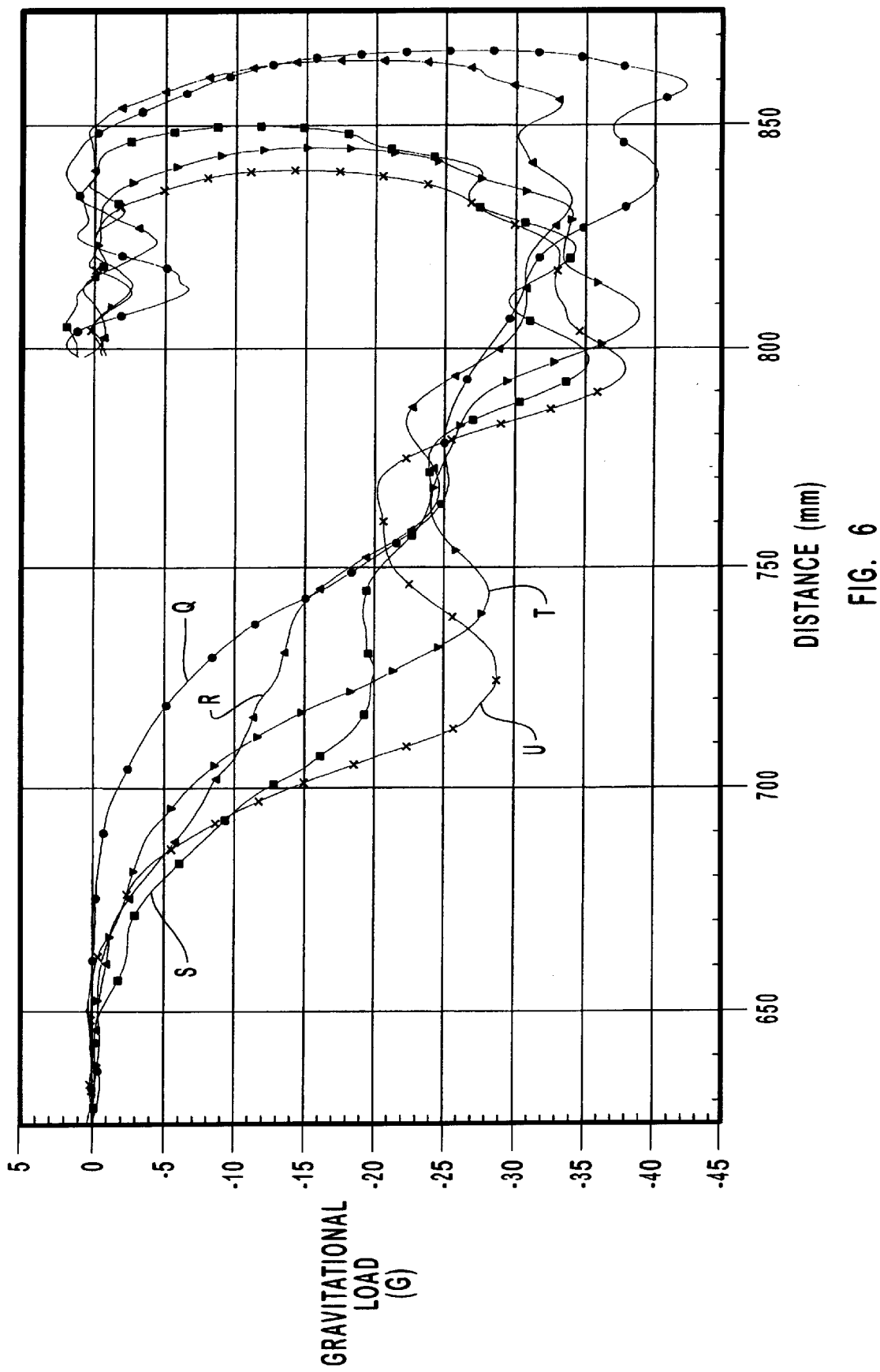

FIG. 6 represents the results of the linear impact tests which were performed in substantially the same manner as that in Example 4. In this series of tests, the quantity of gas generating material 20 was decreased to 33 grams. The amount of igniter material 66 used in primary igniter assembly 50 and secondary igniter assembly 76 remained constant at 2.5 grams. The series of tests in this example compared the performance of primary igniter assembly 50 alone to the case where primary igniter assembly 50 was used in combination with secondary igniter assembly 76 with various actuation delays.

In FIG. 6, Curve Q shows the distance travelled by the dummy and the gravitational-loads experienced by the dummy during the deceleration when only primary igniter assembly 50 is activated. In this particular configuration, the dummy travelled a maximum distance of between 860 mm and 870 mm. Simultaneously, the gravitational-loads applied to the dummy reached a maximum of approximately 42 G to 44 G.

The data represented by Curve R was the performance of inflator 10 using both primary igniter assembly 50 and secondary igniter assembly 76 where there is a 20 millisecond delay prior to activating secondary igniter assembly 76. As shown by Curve R, the dummy travelled a maximum distance of between 850 mm and 870 mm during the collision. Additionally, the gravitational-load experienced by the dummy is reduced to between 33 G and 35 G. Through use of the secondary igniter assembly 76, the occupant of the vehicle is brought to rest within a shorter distance and experienced lower gravitational forces than when only primary igniter assembly 50 was used.

Curve S represents a test that was performed similarly to the test that generated the data shown by Curve R, but used an actuation delay that was increased to 25 milliseconds. As may be seen from Curve S. the dummy travelled a maximum distance of between 845 mm and 855 mm during the collision. Additionally, the gravitational-load experienced by the dummy was reduced to between 34 G and 36 G. Through use of the secondary igniter assembly 76, the occupant was brought to rest within a shorter period of time than with only primary igniter assembly 50 as depicted in Curve Q.

In the test shown by Curve T, the delay between actuation of primary igniter assembly 50 and secondary igniter assembly 76 was increased to 30 milliseconds. As illustrated by Curve T, the dummy travelled a maximum distance of between 840 mm and 850 mm during the collision. Additionally. the gravitational-load applied to the dummy was reduced to between 38 G and 40 G. In comparison with Curve S, the occupant in this test travelled a shorter distance, however, the gravitational-load experienced by the occupant was greater.

Finally, in the test depicted by Curve U the delay between actuating primary igniter assembly 50 and secondary igniter assembly 76 was increased to 35 msec. As may be seen from Curve U, the maximum distance travelled by the dummy is further reduced to between 830 mm and 840 mm. The gravitational-loads experienced by the dummy were only slightly reduced from as those of Curve T. As shown by Curve U the gravitation loads experienced by the dummy were between 37 G and 38 G.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A multi-stage inflator comprising.
   (a) a housing defining an interior chamber;
   (b) a primary igniter assembly disposed in said interior chamber, said primary igniter assembly being configured to initiate the generation of a primary inflation fluid to inflate an air bag;
   (c) a secondary igniter assembly disposed in said interior chamber of said housing, said secondary igniter assembly being configured to augment said primary inflation fluid by producing a secondary inflation fluid which is provided to the air bag at substantially the same temperature as produced by said secondary igniter assembly, thereby increasing the pressure of said primary inflation fluid.

2. An inflator as recited in claim 1, further comprising bypass means for providing said secondary inflation fluid to the air bag at substantially the same temperature as produced by said secondary igniter assembly.

3. An inflator as recited in claim 2, wherein said bypass means comprises a bypass passage configured such that said secondary igniter assembly is in direct fluid communication with the air bag.

4. An inflator as recited in claim 3, wherein said bypass means further comprises a retainer disk.

5. An inflator as recited in claim 4, wherein said bypass passage is defined by said retainer disk and the interior surface of said housing.

6. An inflator as recited in claim 1, wherein the inflator further comprises a filter disposed within said interior chamber proximate to said housing.

7. An inflator as recited in claim 6, further comprising bypass means for providing said secondary inflation fluid to the air bag at substantially the same temperature as produced by said secondary igniter assembly.

8. An inflator as recited in claim 7, wherein said by bypass means is configured to direct said secondary inflation fluid so as to avoid said filter.

9. An inflator as recited in claim 1, wherein said housing comprises a diffuser cover and a base.

10. A inflator as recited in claim 7, wherein said diffuser cover has a plurality of apertures formed therethrough.

11. A multi-stage inflator comprising:
    (a) a housing comprising a top wall, a bottom wall and a side wall, which define an interior chamber therebetween;
    (b) a primary igniter assembly disposed in said interior chamber, said primary igniter assembly being configured to initiate the generation of a primary inflation fluid to inflate an air bag;
    (c) a secondary igniter assembly disposed in said interior chamber of said housing, said secondary igniter assembly being configured to augment said primary inflation fluid by producing a secondary inflation fluid to further inflate the air bag; and
    (d) bypass assembly configured to provide said secondary inflation fluid to the air bag at substantially the same temperature as produced by said secondary igniter assembly, thereby increasing the pressure of said primary inflation fluid.

12. An inflator as recited in claim 11, wherein said bypass assembly comprises a bypass passage configured such that said secondary igniter assembly is in direct fluid communication with the air bag so as to deliver said secondary inflation fluid to the air bag at substantially the same temperature as produced by said secondary igniter assembly.

13. An inflator as recited in claim 12, wherein said bypass means further comprises a retainer disk.

14. An inflator as recited in claim 13, wherein said bypass passage is defined by said retainer disk and the interior surface of said housing.

15. An inflator as recited in claim 12, further comprising a filter disposed within said housing proximate to said side wall.

16. An inflator as recited in claim 12, wherein said bypass assembly is configured to direct said secondary inflation fluid to the air bag without said secondary inflation fluid passing through said filter.

17. An inflator as recited in claim 15, wherein said filter is configured to prevent the passage of particulates.

18. An inflator as recited in claim 15, wherein said primary igniter assembly is located proximate to said filter.

19. An inflator as recited in claim 11, wherein both said primary igniter assembly or said secondary igniter assembly comprise a quantity of igniter material.

20. An inflator as recited in claim 19, wherein said quantity of igniter material in said secondary igniter assembly is composed of a material with an ignition temperature higher than that of said quantity of ignition material in said primary igniter assembly.

21. An inflator as recited in claim 19, wherein:
    (a) a quantity of gas generating material is disposed in said interior chamber of said housing; and
    (b) said quantity of igniter material in said secondary igniter assembly is composed of a material with an auto-ignition temperature less than that of said quantity of gas generating material.

22. A multi-stage inflator comprising:
    (a) a housing defining an interior chamber therein, said housing being configured to cooperate with an air bag;
    (b) a filter disposed within said interior chamber proximate to said housing;
    (c) a primary igniter assembly disposed in said interior chamber, said primary igniter assembly being configured to initiate the generation of a primary inflation fluid which passes through said filter prior to inflating the air bag;
    (d) a secondary igniter assembly disposed in said interior chamber of said housing, said secondary igniter assembly being configured to augment said primary inflation fluid by producing a secondary inflation fluid; and
    (e) bypass assembly configured to direct said secondary inflation fluid to the air bag at substantially the same temperature as produced by said secondary igniter assembly, thereby increasing the pressure of said primary inflation fluid, a bypass passage being configured.

23. An inflator as recited in claim 21, wherein bypass assembly comprises
    (a) a retainer disk; and
    (b) a bypass passage configured to direct said secondary inflation fluid to the air bag without said secondary inflation fluid passing through said filter, thereby providing said secondary inflation fluid to said air bag substantially without reducing the temperature of said secondary inflation fluid.

24. An inflator as recited in claim 22, wherein said bypass passage is defined by said retainer disk and the inside surface of said housing.

25. An inflator as recited in claim 22, wherein said retainer disk has a hollow collar formed therein configured to cooperate with said secondary igniter assembly.

26. An inflator as recited in claim 22, wherein said retainer disk further is configured to cooperate with said filter such that said primary inflation gas is prevented from circumventing said filter.

* * * * *